Jan. 24, 1939.  C. P. DEBUCH  2,144,914
PROCESS FOR THE PRODUCTION OF METALLIC ZINC
Filed July 23, 1936
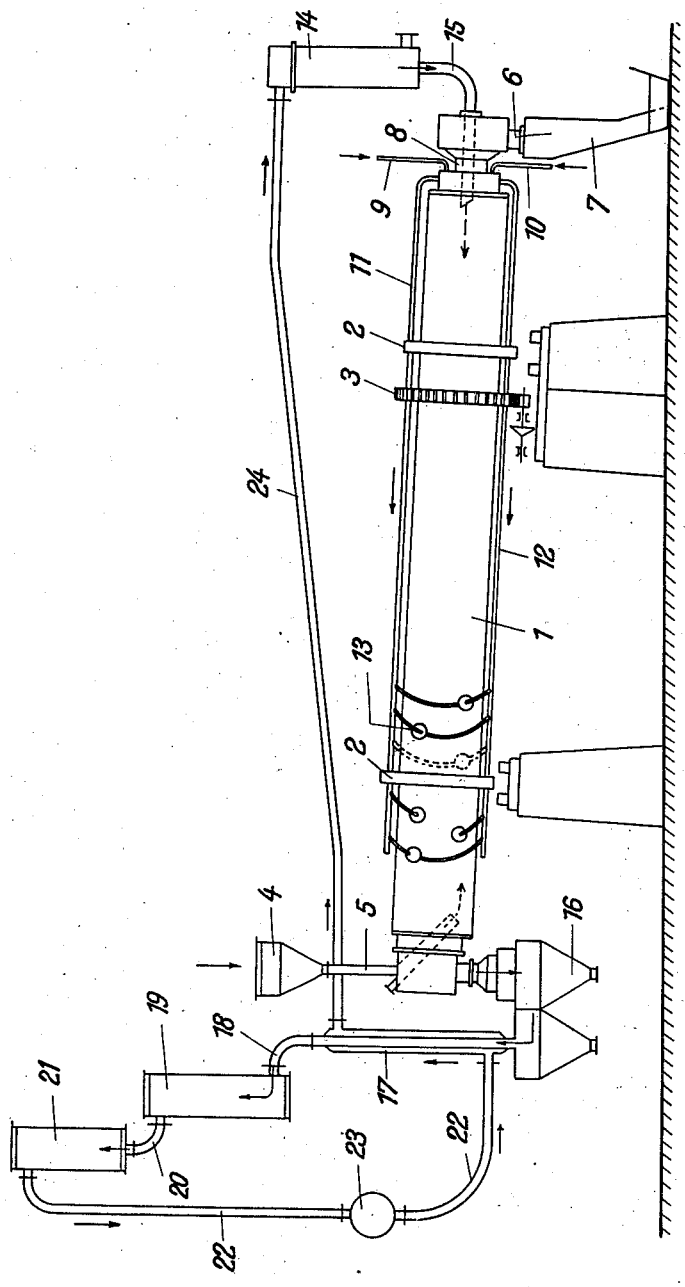
Inventor:
CARL PAUL DEBUCH
Attorney Patented Jan. 24, 1939

2,144,914

UNITED STATES PATENT OFFICE 2,144,914

PROCESS FOR THE PRODUCTION OF METALLIC ZINC

Carl Paul Debuch, Frankfort-on-the-Main, Germany, assignor to American Lurgi Corporation, New York, N. Y., a corporation of New York Application July 23, 1936, Serial No. 92,065
In Germany July 23, 1935

16 Claims. (Cl. 75—86)

This invention relates to a process for the production of metallic zinc.

The reduction of roasted zinc blende or other oxidic zinc compounds, by dry methods, is carried out chiefly in the muffle with reducing carbon. Proposals to employ rotary drums for this purpose in which a roasted blende is reduced in the presence of reducing carbon by admixture with a solid heat carrier previously heated to a high temperature, and from which zinc vapours produced by the reduction are scrubbed with an inert hot gas in suitable condensers, have not proved successful in practice hitherto. Even when the inert gas was circulated through the rotary drum and the condenser and was freed from zinc oxide, zinc dust and oxidizing constituents, such as carbon dioxide, while passing from the latter to the former, the difficulties involved in condensation were too great and the loss of zinc was impermissibly high. The same drawbacks are attendant on the known proposals for using iron as a reducing agent for zinc ores. According to one known process a current of illuminating gas is passed through the zinciferous material containing zinc in the form of oxide and also iron, said material being placed in an externally heated inclined muffle. In the first place, in this process the iron is reduced at a low temperature, whereoxide recovered by said volatilization being then worked up to metallic zinc. All these processes are attendant with the drawback of a very considerable consumption of fuel.

According to the present invention the reduction of oxidic zinc compounds is performed in conjunction with that of oxidic iron compounds at a temperature below the vaporizing temperature of zinc and by means of reducing gases in a rotary drum or other moving furnace. Thus, for example, an intimate mixture of roasted blende, zinc oxide or the like with iron oxides, is subjected to the process of the present invention, the temperature amounting to about 700–900° C. and preferably 800° C.

Solid metallic iron is obtained the reduced zinc being also in the metallic state. From this mixture the zinc can be recovered, as metal by distillation, for example in a retort or electric furnace, whereupon the iron can be worked up into the various commercial grades of iron or steel by melting. In many cases, however, it is also possible to utilize the mixture of iron and zinc as such, for example as a catalyst, or as a reducing agent in numerous processes of the chemical industry or the like.

The unexpected fact that, by the process according to the present invention a good yield of ing may be performed with advantage in furnaces of known types, especially blast grates, such as sintering apparatus and Dwight-Lloyd apparatus, and no special measures for the purpose of preventing the undesired formation of zinc ferrite, such as occurs in other reduction processes, are required, since in the process according to the invention, ferrites are by no means a source of trouble, but are most suitable therefor, owing to the molecular mixture of zinc oxide and ferric oxide. Such ores can be directly subjected, in lump or coarsely granular form, to the process according to the invention. Purely zinc ores, or zinc ores that are deficient in iron, are prepared for the process of the present invention by crushing them very fine—for example to grain sizes below 1 mm.—and careful mixing with iron ores of the same size, roasted pyrites being, of course, included in this category. The mixture is preferably first sintered into lump form, especially when its components, or parts of same, are present as sulphides or like roasted pyrites, contain more or less sulphur. In this manner—in addition to dead-roasting when necessary—a particularly intimate contact of the individual portions of the mixture is obtained. Accordingly, this method of preparation is also recommended for a mixture of zinc ore and iron ore, which no longer contains harmful quantities of sulphur.

The charge material prepared in this manner is introduced into the reduction furnace, preferably in a pre-heated condition. For preference, a rotary drum furnace equipped with baffle rings and turning devices, is employed. The furnace charge may also receive an addition of solid or liquid reducing agents, if desired, but their amount should be so small that, so far as is possible, no vaporization of the zinc occurs during the reduction. The reducing gases, such as producer gas, water gas, cracked coke-oven gas or the like, are passed through the reduction furnace in counter-current to the charge, and said gases are preferably admitted in known manner in a highly heated condition. The heating may be effected, with advantage, by the heat of the gases issuing from the furnace, for example, in a heat exchanger, in such a manner that the reduction gas is first raised to temperatures of 300–500° C. by heat exchange with the effluent gases from the furnace, and then further heated in known heating apparatus which are advantageously operated with a portion of the combustible exhaust gases from the furnace or—in the event of the reducing agent being employed in circulation—surplus gas withdrawn from the circulation.

As a rule it is necessary to supply further heat to the reduction furnace, which can be done advantageously by indirect, or direct, heating. In the latter case, air or oxygen (or air enriched with oxygen) is admitted into the atmosphere of the furnace at various points distributed over the length, or length and perimeter, of the furnace, so that a portion of the reducing gas burns at the points of admission. In this way, specially intense heating can be applied to the upper part of the furnace, where, for the most part, the reduction of the higher iron oxides to ferrous oxide, and the reduction of the iron occurs. Naturally, the heating in all parts of the furnace must be so regulated that the furnace gases still contain a sufficient amount of the constituents—hydrogen and carbon monoxide in particular—necessary for reducing the iron. The same procedure is also adopted when the heating is performed by the admission of heating gases.

A portion of the iron oxides requisite for the process according to the invention may also be replaced by finely divided metallic iron, if available at a sufficiently low price.

The reduced charge material passes from the reduction furnace—preferably while still hot—into retorts or electric furnaces in which the zinc is distilled off from the iron by raising the temperature of the material to above the volatilization point of the zinc. This is advantageously facilitated as in other known processes, by passing through the charge a gas which does not oxidize zinc. When the distillation is over, in the case of an electric furnace, the iron can at once be melted down, for the production of pig iron, wrought iron or steel. Of course, a special remelting furnace into which the material is charged, can also be employed for this purpose. The zinc is condensed, and usually possesses the character of crude works zinc. Nevertheless, refined zinc can also be produced by fractional condensation of the zinc fumes after the manner of the process of the New Jersey Zinc Co.

The advantages of the process are chiefly to be regarded as consisting in its low fuel consumption and in the joint recovery of zinc and iron, together with the possibility of treating complex ores with a comparatively low zinc content, such as Rammelsberg ores, Meggen pyrites (or roasted pyrites) or the like.

The invention is in particular, characterized by a low consumption of fuel, since it is now possible to perform the reduction of zinc whilst directly contacting the material with gases which are heated by combustion and which contain considerable quantities of carbon dioxide and steam. Moreover, the advantage is gained that a continuously operating furnace with high throughput capacity can be used for the reduction. With the process according to the invention moreover, the exhaust gases issue from the reduction furnace at a low temperature, ranging between about 500° and 700° C. In this process, therefore, the utilizable heat drop of the heating gases is incomparably greater than with many known processes. A further substantial saving of heat is obtained by the possibility of employing in a particularly advantageous manner in circulation, a large portion of the reduction gases which are preferably employed in considerable excess.

In order more clearly to understand the invention, reference is made to the accompanying drawing, which illustrates diagrammatically and by way of example, one embodiment of apparatus suitable for carrying out the invention.

In said drawing:

1 is the rotary drum furnace which is mounted on track rings 2 in known manner and can be rotated by means of the drive 3. 4 is a bunker for the raw material which passes into the furnace through a charging device 5. 6 is the device for discharging the treated material which passes, with exclusion of air, into a collecting and cooling receptacle 7.

Opening into the lower head 8 of the furnace are supply pipes 9, for air or oxygen, and 10 for a combustible gas. Through pipes 11, 12 connected with the furnace, oxygen and combustible gas are supplied separately to the several burners 13 of the furnace only those situated in the upper portion of the furnace being shown in the drawing.

Furthermore, the gas required for the reduction is admitted into the furnace, entering the furnace head from the heater 14 by way of the pipe 15. Dust separators 16 are provided for freeing the furnace gases from dust. 17 is the heat exchanger, in which the dust-free exhaust gases from the furnace yield up their heat to the gas returning into circulation. From the heat exchanger, the furnace gases pass, by way of the pipe 18, firstly to the washer 19, in which they are freed from their contained steam by cooling. From the washer 19 they pass through the pipe 20 into the apparatus 21 which serves to extract the carbon dioxide from the gases. The gases (or a portion of them) freed from dust, steam and carbon dioxide, are passed, by way of the pipe 22, blower 23, heat exchanger 17 and pipe 24, to the gas heater 14, from which they return into the furnace. This gas circulation is also provided with branches for removing a portion of the used gas, and intakes for fresh gas. The withdrawn gas can be used as heating medium for the gas heater 14.

The material to be treated, such as zinc oxide, or roasted zinc blende, in admixture with magnetite ores or roasted pyrites of low sulphur content, passes through the charging device 5 into the rotary-drum furnace 1, where it is heated to the requisite reduction temperature. The reduction of the higher iron oxides to ferrous oxide occurs first being followed by the reduction of the ferrous oxide to metallic iron, and finally by the reduction of the zinc oxide. The reduced charge material, which consists substantially of a mixture of metallic zinc and iron, passes through the discharging device 6, either into the zinc-distillation furnace direct, or else is cooled and then worked up in the same manner, or used for other purposes. The gas employed for the reduction enters the furnace hot (for example with temperatures of 900° C.), through which it flows in the opposite direction to that taken by the ore. The path of the ore in the furnace is determined by the baffle rings and turning devices provided therein. The flow of the gas is controlled by suitable throttle and shut-off members provided in the exhaust and supply pipes. The heating of the furnace is adjusted in such a manner that optimum temperatures for the reduction prevail in all parts of the furnace. After leaving the furnace, the exhaust gases are first freed from the bulk of the contained dust, and are then cooled down by heat exchange with the returning gas. Further purification is effected in the washers 19 and 21. A portion of the gas—corresponding, for example, at least to the amount of the fresh heating gas supplied to the furnace—is withdrawn from the circulation, the remainder returning to the furnace by way of the heat exchanger 17 and gas heater 14. This current of gas is supplied with fresh gas, such as cracked coke-oven gas, in sufficient quantity to maintain the composition of the gas entering the furnace at the suitable high concentration in hydrogen and carbon monoxide. Owing to the reduction of the oxides of iron and zinc, a portion of the hydrogen and carbon monoxide is transformed into steam and carbon dioxide, during the passage of the gas through the furnace. In addition, the gas absorbs certain amounts of nitrogen when air—or air only slightly enriched in oxygen—is employed for operating the burners.

The content of steam and carbon dioxide in the gas is controlled by the separators 19 and 21. The control of the nitrogen content is effected by withdrawing a portion of the used gas from the circulation and adding fresh gas with a correspondingly lower nitrogen content.

I claim:

1. The process for the production of metallic zinc from a mixture of oxidic compounds of zinc and iron which comprises treating a mixture of oxidic compounds of zinc and iron with reducing gases in a rotary-drum furnace at temperatures at which no substantial vaporization of zinc occurs to reduce said oxidic compounds of iron to metallic iron and said oxidic compounds of zinc to metallic zinc, and recovering said metallic zinc by distillation.

2. The process for the production of metallic zinc and metallic iron from a mixture containing oxidic compounds of zinc and iron which comprises heating said mixture in a furnace in the presence of reducing gases, reducing a part of said oxidic compounds of iron to metallic iron by means of said reducing gases, reducing zinc oxide to metallic zinc by means of said metallic iron and said reducing gases at temperatures at which no substantial quantities of zinc evaporate so that a mixture of metallic iron and metallic zinc is obtained, withdrawing said mixture of metallic iron and zinc from said furnace and separating zinc and iron.

3. The process for producing metallic zinc and metallic iron from a mixture containing oxides of zinc and oxides of iron which comprises heating a mixture containing oxidic compounds of zinc and oxides of iron in a furnace in admixture with small amounts of solid combustibles, reducing part of said iron oxide to metallic iron in the presence of reducing gases, reducing said zinc oxides to metallic zinc by means of said metallic iron and of said reducing gases at temperatures at which no substantial quantities of zinc evaporate, so that a mixture of metallic iron and metallic zinc is obtained, withdrawing said metallic mixture from said furnace and separating zinc and iron by distillation.

4. The process for simultaneously producing metallic zinc and metallic iron from mixtures containing iron oxides and zinc oxides which comprises heating a mixture containing iron oxides and zinc oxides in a furnace, reducing at least a part of said iron oxides to metallic iron in the presence of reducing gases, reducing said zinc oxides to metallic zinc by means of said reducing gases in the presence of said metallic iron at temperatures between 700° C. and 900° C. to form a mixture of metallic zinc and metallic iron and separating said metallic iron and metallic zinc.

5. The process for producing metallic zinc and metallic iron from a mixture containing iron, zinc and sulfur which comprises roasting said mixture to obtain a desulfurized mixture containing oxidic compounds of iron and zinc, heating said desulfurized mixture in a furnace at temperatures at which substantially no zinc evaporates in the presence of reducing gases to reduce said oxides of iron to metallic iron, reducing said oxides of zinc in the presence of said metallic iron by means of reducing gases to metallic zinc and recovering metallic zinc and metallic iron.

6. The process for producing metallic iron and metallic zinc from mixtures containing oxidic compounds of zinc and oxidic compounds of iron which comprises sintering a mixture containing oxidic compounds of iron and oxidic compounds of zinc, heating said sintered mixture in a furnace, reducing part of said oxidic compounds of iron to metallic iron by means of reducing gases, reducing said oxidic compounds of zinc by means of said metallic iron and reducing gases at temperatures at which substantially no zinc evaporates to obtain a mixture of metallic iron and metallic zinc, withdrawing said mixture of metallic iron and metallic zinc and separating said metallic zinc by distillation.

7. The process of treating a charge containing oxidic compounds of iron and of zinc which comprises conducting the charge through a rotary tubular furnace, introducing heat by stages into the charge during its progress through said furnace, bringing said charge in said rotary furnace into intimate contact with gases which are capable of reducing the oxidic iron compounds to metal and to reduce the oxidic zinc compounds to metal in the presence of iron at temperatures at which no substantial quantities of zinc evaporate so that a mixture of metallic iron and of metallic zinc is produced, and subjecting said mixture to distillation after its withdrawal from the rotary tube furnace in order to separately recover zinc and iron.

8. The process for producing metallic iron and metallic zinc from a charge containing oxidic compounds of iron and of zinc which comprises conducting the charge through a rotary tube furnace, introducing heat to the charge by stages during its passage through the rotary tube furnace, bringing said charge in said furnace into intimate contact with gases which are capable of reducing the oxidic iron compounds to metal and which are capable of reducing the oxidic zinc compounds to metal in the presence of metallic iron at temperatures at which no substantial quantities of zinc evaporate, so that a mixture of metallic iron and of metallic zinc is produced, subjecting said mixture after its withdrawal from said rotary furnace to distillation in order to separately recover zinc and iron, and assisting said distillation by conducting an inert gas through the mixture of iron and zinc.

9. The process for producing metallic iron and metallic zinc from a charge containing oxidic compounds of iron and zinc which comprises conducting the charge through a rotary furnace in admixture with small amounts of solid combustibles, introducing heat by stages into the charge during its passage through said rotary furnace, bringing said charge in said furnace in contact with gases which are capable of reducing said oxidic iron compounds to metal and which are capable of reducing said oxidic zinc compounds to metal in the presence of metallic iron at temperatures at which no substantial quantities of zinc evaporate so that a mixture of metallic iron and of metallic zinc is obtained, and subjecting said mixture after its withdrawal from the furnace to distillation to separately recover iron and zinc.

10. The process for producing metallic iron and metallic zinc from a charge containing oxidic compounds of iron and of zinc which comprises introducing said charge into a rotary tube furnace, bringing said charge in said rotary furnace in intimate contact with gases capable of reducing the oxidic iron compounds to metal and of reducing said oxidic zinc compounds to metal in the presence of metallic iron, at temperatures at which no substantial quantities of zinc evaporate so that a mixture of metallic iron and of metallic zinc is obtained, conducting said reducing gases through said furnace counter-currently to said charge, admixing hot combustion gases to said reducing gases at several points distributed along the length of said furnace, and withdrawing a mixture of metallic iron and of metallic zinc at the lower end of said furnace.

11. The process for producing metallic iron and metallic zinc from a charge containing oxidic compounds of iron and of zinc which comprises conducting a charge through a rotary tubular furnace, bringing the charge in said furnace into intimate contact with hot gases capable of reducing the oxidic iron compounds into metal and of reducing the oxidic zinc compounds to metallic zinc in the presence of metallic iron at temperatures at which no substantial amounts of zinc evaporate so that a mixture of metallic iron and of metallic zinc is obtained, said reducing gases being introduced in a hot state at the lower end of said rotary furnace countercurrently to said charge, admixing hot combustion gases to said reducing gases at a plurality of points distributed along the length of said furnace, and withdrawing metallic iron and zinc at the lower end of said furnace.

12. The process for producing metallic iron from a charge containing oxidic compounds of iron and of zinc which comprises conducting said charge through a rotary tube furnace, bringing said charge in intimate contact with hot gases in the said furnace, said gases being capable of reducing oxidic iron compounds to metal and of reducing oxidic zinc compounds to metallic zinc in the presence of metallic iron at temperatures at which no substantial quantities of zinc evaporate so that a mixture of metallic iron and of metallic zinc is obtained, introducing said reducing gases in a preheated hot state at the lower end of said furnace countercurrently to the charge, admixing hot combustion gases to said reducing gases at a plurality of points distributed along the length of said furnace, eliminating inert constituents from a portion of said gases and reintroducing said gases into the furnace, and withdrawing a mixture of metallic iron and of metallic zinc at the lower end of the furnace.

13. The process for producing metallic iron and metallic zinc from a charge containing oxidic compounds of iron and of zinc which comprises conducting a charge through a rotary tubular furnace, bringing said charge in intimate contact with hot gases capable of reducing the oxidic iron compounds to metal and of reducing the oxidic zinc compounds to metallic zinc in the presence of metallic iron at temperatures at which no substantial quantities of zinc evaporate so that a mixture of metallic iron and of metallic zinc is obtained, introducing said reducing gases in a hot state at the lower end of said furnace and countercurrently to said charge, admixing to said gases during their passage through said furnace hot combustion gases at a plurality of points distributed along the length of said furnace, freeing a portion of said gases from inert constituents to obtain an improved gas, subjecting said improved gas to heating by heat exchange, reintroducing the gas thus treated into said furnace, and withdrawing a mixture of metallic iron and of metallic zinc at the lower end of said furnace.

14. The process for producing metallic iron and metallic zinc from a charge containing oxidic compounds of iron and of zinc which comprises conducting a charge through a rotary tubular furnace, bringing said charge in intimate contact with hot gases capable of reducing the oxidic iron compounds to metal and of reducing the oxidic zinc compounds to metallic zinc in the presence of metallic iron at temperatures at which no substantial quantities of zinc evaporate so that a mixture of metallic iron and of metallic zinc is obtained, conducting said reducing gases through said furnace countercurrently to the charge, subjecting said gases to partial combustion during their passage through said furnace, and withdrawing the mixture of metallic iron and of metallic zinc at the lower end of said furnace.

15. The process for producing metallic iron and metallic zinc from a charge containing oxidic compounds of iron and zinc which comprises conducting a charge through a rotary tubular furnace, bringing said charge in intimate contact with hot gases capable of reducing said oxidic iron compounds to metal and of reducing said oxidic zinc compounds to metallic zinc in the presence of metallic iron at temperatures at which no substantial quantities of zinc evaporate so that a mixture of metallic iron and of metallic zinc is formed, conducting said reducing gases through said furnace countercurrently to said charge, admixing combustion air to said gases during their passage through said furnace at a plurality of points distributed along the length of said furnace for burning a portion of said gases, and withdrawing a mixture of metallic iron and of metallic zinc at the lower end of said furnace.

16. The process for producing metallic iron and metallic zinc from a charge containing oxidic compounds of iron and of zinc which comprises conducting a charge through a rotary tubular furnace, bringing said charge in intimate contact with hot gases capable of reducing oxidic iron compounds to metal and of reducing oxidic zinc compounds to metallic zinc in the presence of metallic iron at temperatures at which no substantial quantities of zinc evaporate so that a mixture of metallic iron and of metallic zinc is obtained, conducting said reducing gases through said furnace countercurrently to the charge, admixing combustion air and hot combustion gases to said gases during their passage through said furnace at a plurality of points distributed along the length of said furnace whereby a portion of said gases is burned, and withdrawing a mixture of metallic iron and of metallic zinc at the lower end of said furnace.

CARL PAUL DEBUCH.